(12) United States Patent
Koren et al.

(10) Patent No.: US 12,468,570 B2
(45) Date of Patent: Nov. 11, 2025

(54) ASYMMETRIC CENTRAL PROCESSING UNIT (CPU) SHARING WITH A CONTAINERIZED SERVICE HOSTED IN A DATA STORAGE SYSTEM

(71) Applicant: Dell Products L.P., Round Rock, TX (US)

(72) Inventors: Roy Koren, Kfar Saba (IL); Vladimir Shveidel, Pardes-Hana (IL); Itai Shavit, Ramat Gan (IL); Peleg Vigodny, Meona (IL); Leron Fliess, Kiryat Ono (IL); Philip Love, Goleta, CA (US)

(73) Assignee: Dell Products L.P., Round Rock, TX (US)

( * ) Notice: Subject to any disclaimer, the term of this patent is extended or adjusted under 35 U.S.C. 154(b) by 691 days.

(21) Appl. No.: 17/859,101

(22) Filed: Jul. 7, 2022

(65) Prior Publication Data

US 2024/0012679 A1 Jan. 11, 2024

(51) Int. Cl.
*G06F 9/48* (2006.01)
*G06F 9/38* (2018.01)
*G06F 9/50* (2006.01)

(52) U.S. Cl.
CPC .......... *G06F 9/4881* (2013.01); *G06F 9/3877* (2013.01); *G06F 9/5038* (2013.01); *G06F 9/505* (2013.01)

(58) Field of Classification Search
CPC .... G06F 9/4881; G06F 9/3877; G06F 9/5038; G06F 9/505; G06F 3/061; G06F 3/0658; G06F 9/5061; G06F 3/067; G06F 9/5027
See application file for complete search history.

(56) References Cited

U.S. PATENT DOCUMENTS

| | | | |
|---|---|---|---|
| 10,817,220 B2 | 10/2020 | Bono et al. | |
| 11,429,500 B2 | 8/2022 | Gao et al. | |
| 11,494,212 B2 | 11/2022 | Sunku et al. | |
| 12,034,740 B1* | 7/2024 | Carmack | H04L 63/1416 |
| 2002/0116436 A1* | 8/2002 | Whitton | G06F 9/462 |
| | | | 712/E9.035 |
| 2017/0177221 A1* | 6/2017 | Trehan | H04L 67/1097 |
| 2022/0100621 A1* | 3/2022 | Gao | G06F 3/0659 |
| 2023/0093884 A1* | 3/2023 | Quinn | G06F 9/5027 |
| | | | 709/226 |
| 2023/0244392 A1* | 8/2023 | Jain | G06F 3/0631 |
| | | | 711/154 |

* cited by examiner

*Primary Examiner* — Chat C Do
*Assistant Examiner* — Tuan M Nguyen
(74) *Attorney, Agent, or Firm* — BainwoodHuang

(57) ABSTRACT

A shared portion of processor cores in a data storage system are allocated for sharing between a storage system application and a containerized service also executing in the data storage system. A non-shared portion of the processor cores are allocated for exclusive use by the storage system application. The storage system application preferentially uses processor cores in the shared portion of the processor cores to execute background tasks, and preferentially uses processor cores in the non-shared portion to perform host I/O request processing. The storage system application may from time to time voluntarily yield one or more of the processor cores in the shared portion of the processor cores for execution of the containerized service.

9 Claims, 6 Drawing Sheets

ASYMMETRIC CENTRAL PROCESSING UNIT (CPU) SHARING WITH A CONTAINERIZED SERVICE HOSTED IN A DATA STORAGE SYSTEM

TECHNICAL FIELD

The present disclosure relates generally to data storage systems that host containerized services.

BACKGROUND

Data storage systems are arrangements of hardware and software that are coupled to non-volatile data storage drives, such as solid state drives and/or magnetic disk drives. The data storage system services host I/O requests received from physical and/or virtual host machines ("hosts"). The host I/O requests received by the data storage system specify host data that is written and/or read by the hosts. The data storage system executes software that processes the host I/O requests by performing various data processing tasks to efficiently organize and persistently store the host data in the non-volatile data storage drives of the data storage system.

SUMMARY

In the disclosed technology, a shared portion of the processor cores in a data storage system are allocated for sharing between a storage system application and a containerized service that also executes in the data storage system. A non-shared portion of the processor cores are allocated for exclusive use by the storage system application. Any given processor core is only allocated to one of the two portions of the processor cores, i.e. to either the shared portion of the processor cores or to the non-shared portion of the processor cores.

The storage system application preferentially uses processor cores in the shared portion of the processor cores to execute background tasks that are performed by the storage system application. At the same time, the storage system application preferentially uses processor cores in the non-shared portion of the processor cores to execute the host I/O request processing that is performed by the storage system application. For example, the containerized service may provide a file-based data storage service to one or more hosts, and the storage system application may provide a block-based data storage service to one or more hosts.

In some embodiments, the storage system application preferentially uses processor cores in the shared portion of the processor cores to execute the background tasks at least in part by i) determining a total number of processor cores currently needed to execute the background tasks performed by the storage system application, and, ii) responsive to a determination that the total number of processor cores currently needed to execute the background tasks performed by the storage system application is not greater than a total number of processor cores within the shared portion of the processor cores, using only processor cores within the shared portion of the processor cores to execute the background tasks performed by the storage system application.

In some embodiments, the storage system application preferentially uses processor cores in the shared portion of the processor cores to execute the background tasks by, in response to the total number of processor cores currently needed to execute the background tasks performed by the storage system application being greater than the total number of processor cores within the shared portion of the processor cores, using all the processor cores within the shared portion of the processor cores and at least one of the processor cores within the non-shared portion of the processor cores to execute the background tasks performed by the storage system application.

In some embodiments, the storage system application preferentially uses processor cores in the non-shared portion of the processor cores to execute host I/O request processing by, in response to the total number of processor cores currently needed to execute the background tasks performed by the storage system application being not greater than a total number of processor cores within the shared portion of the processor cores, using at least all processor cores that are within the non-shared portion of the processor cores to execute host I/O request processing performed by the storage system application.

In some embodiments, the storage system application preferentially uses processor cores in the non-shared portion of the processor cores to execute host I/O request processing by, in response to the total number of processor cores currently needed to execute the background tasks performed by the storage system application being less than a total number of processor cores within the shared portion of the processor cores, using all processor cores that are within the non-shared portion of the processor cores and at least one processor core within the shared portion of the processor cores to execute host I/O request processing performed by the storage system application.

In some embodiments, the storage system application preferentially uses processor cores in the non-shared portion of the processor cores to execute host I/O request processing by assigning a relatively smaller amount of host I/O request processing to the at least one processor core within the shared portion of the processor cores than an amount of host I/O request processing that is assigned to the processor cores within the non-shared portion of the processor cores.

In some embodiments, in response to a determination that multiple processor cores within the shared portion of the processor cores are currently being used to execute host I/O request processing performed by the storage system application, specific amounts of host I/O request processing to be assigned to individual ones of the processor cores within the shared portion of the processor cores that are currently being used to execute host I/O request processing are selected based on loading feedback obtained for individual ones of the processor cores within the processor cores within the shared portion of the processor cores being used to execute host I/O request processing, such that higher amounts of host I/O request processing are assigned to less loaded ones of the processor cores within the shared portion of the processor cores being used to execute host I/O processing.

In some embodiments, the storage system application preferentially uses processor cores in the non-shared portion of the processor cores to execute the host I/O request processing by, in response to the total number of processor cores currently needed to execute the background tasks performed by the storage system application being greater than the total number of processor cores within the shared portion of the processor cores, using all processor cores within the non-shared portion of the processor cores that are not currently being used to execute background tasks to execute host I/O request processing.

In some embodiments, the storage system application yields, in response to detecting a high load on the containerized service, at least one of the processor cores in the shared portion of the processor cores for preferred execution of the containerized service with respect to execution of the storage system application. Detecting a high load on the containerized service may also cause the storage system application to increase a frequency at which it yields one or more shared processor cores for preferred execution of the containerized service.

The disclosed technology is integral to providing a practical technical solution to the shortcomings that may be present in other technologies. For example, the disclosed technology provides a practical solution to the problem of sharing processor cores within a data storage system. In this regard, the inflexibility of data storage systems in which processor cores are never shared by the storage system application is addressed by sharing a portion of the processor cores in the data storage system with the containerized application. Embodiments of the disclosed technology are also integral to using a containerized application to improve the functionality of the data storage system, e.g. by adding a containerized service to services already provided by the storage system application.

In addition, the disclosed sharing of a portion of the processor cores between the storage system application and the containerized application may advantageously improve dynamic utilization of processor cores, i.e. across different relative loadings between the storage system application and the containerized application. Furthermore, by preferentially using shared processor cores for background tasks, and non-shared processor cores for host I/O request processing, embodiments of the disclosed technology may advantageously limit or completely avoid undesirable increases in host I/O request processing latency for host I/O request processing, which may result when execution of host I/O request processing is interrupted by execution of the containerized application on the shared processor cores.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
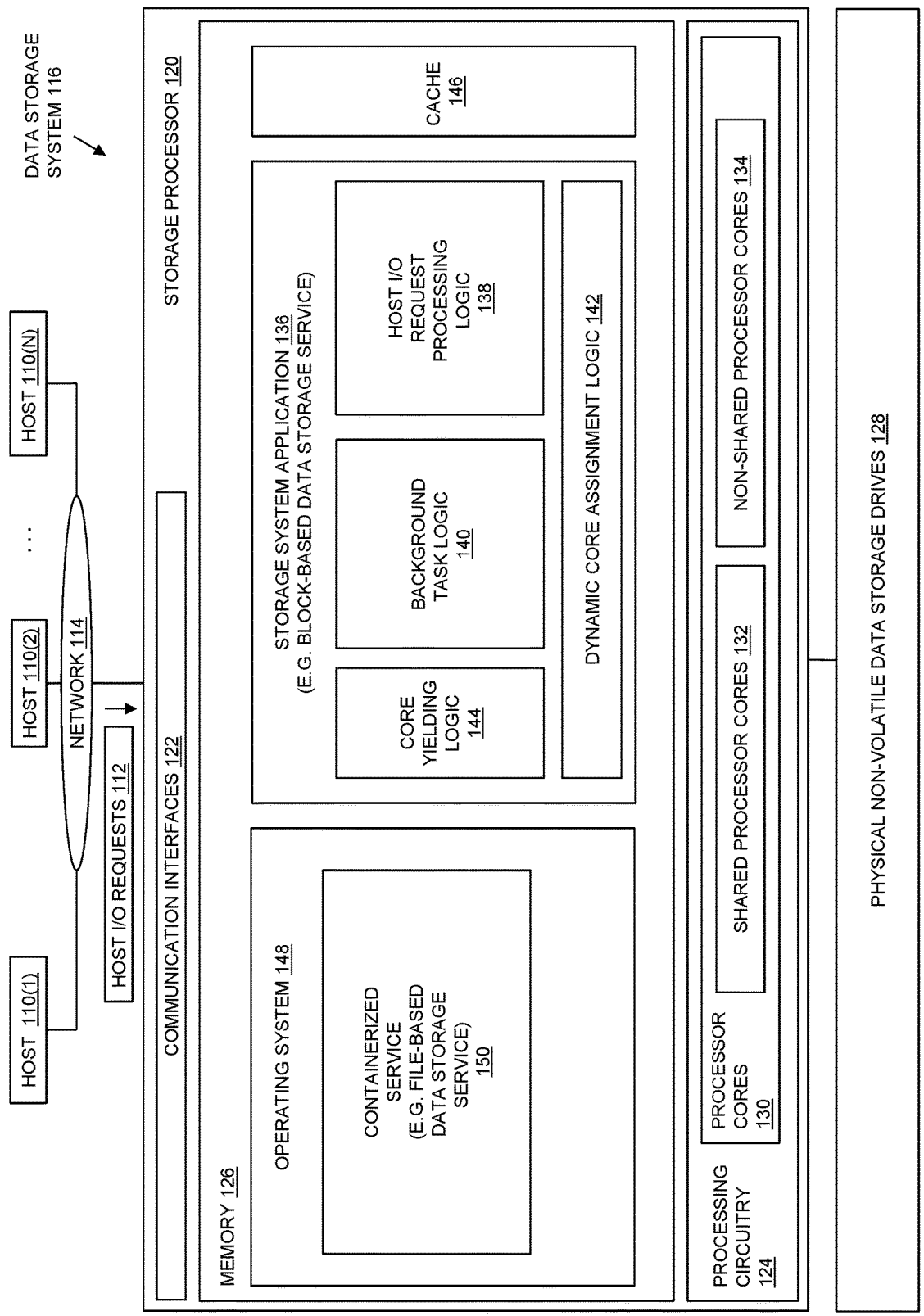
FIG. 1 is a block diagram showing an illustrative example of a data storage system including an embodiment of the disclosed technology.

Embodiments of the invention will now be described with reference to the figures. The embodiments described herein are provided only as examples, in order to illustrate various features and principles of the disclosed technology, and the invention is broader than the specific embodiments described herein.

Embodiments of the disclosed technology are integrated into a practical solution for effectively utilizing processor cores in a data storage system that contains and executes both a storage system application and a separate containerized service. In the disclosed technology, a shared portion of the processor cores in the data storage system are allocated for sharing between the storage system application and the containerized service, and a non-shared portion of the processor cores are allocated for exclusive use by the storage system application. Each processor core is only allocated to one of the two portions of the processor cores. The storage system application i) preferentially uses processor cores in the shared portion of the processor cores to execute background tasks, and ii) preferentially uses processor cores in the non-shared portion of the processor cores to execute host I/O request processing. For example, the containerized service may provide a file-based (or "file-level") data storage service, and the storage system application may provide a block-based (or "block-level") data storage service.

The storage system application preferentially uses processor cores in the shared portion of the processor cores to execute background tasks by determining a total number of processor cores that are currently needed to execute background tasks, and, in response to a determination that the total number of processor cores currently needed to execute background tasks is not greater than a total number of processor cores within the shared portion of the processor cores, using only processor cores that are within the shared portion of the processor cores to execute background tasks.

The storage system application may also preferentially use processor cores in the shared portion of the processor cores to execute background tasks by, in response to a determination that the total number of processor cores currently needed to execute background tasks is greater than the total number of processor cores within the shared portion of the processor cores, using all the processor cores within the shared portion of the processor cores and at least one of the processor cores within the non-shared portion of the processor cores to execute background tasks.

The storage system application preferentially uses processor cores in the non-shared portion of the processor cores to execute host I/O request processing by, in response to a determination that the total number of processor cores currently needed to execute background tasks is not greater than a total number of processor cores within the shared portion of the processor cores, using at least all processor cores that are within the non-shared portion of the processor cores to execute host I/O request processing.

The storage system application may preferentially use processor cores in the non-shared portion of the processor cores to execute host I/O request processing by, in response to a determination that the total number of processor cores currently needed to execute the background tasks is less than the total number of processor cores within the shared portion of the processor cores, using all processor cores within the non-shared portion of the processor cores and at least one processor core within the shared portion of the processor cores to execute host I/O request processing.

The storage system application may preferentially use processor cores in the non-shared portion of the processor cores to execute host I/O request processing by assigning a relatively smaller amount of host I/O request processing to at least one processor core within the shared portion of the processor cores currently executing host I/O processing than an amount of host I/O request processing that is assigned processor cores within the non-shared portion of the processor cores.

In response to a determination that multiple processor cores within the shared portion of the processor cores are currently being used to execute host I/O request processing, the storage system application may select specific amounts of host I/O request processing to be assigned to individual ones of the processor cores within the shared portion of the processor cores currently being used to execute host I/O request processing application, based on loading feedback obtained for individual ones of the processor cores in the shared portion of the processor cores currently being used to execute host I/O request processing. Relatively higher amounts of host I/O request processing may be assigned to relatively less loaded ones of the processor cores within the shared portion of the processor cores.

In some embodiments, the storage system application may preferentially use processor cores in the non-shared portion of the processor cores to execute host I/O request processing by, in response to a determination that the total number of processor cores currently needed to execute the background tasks is greater than the total number of processor cores within the shared portion of the processor cores, using only all of those processor cores within the non-shared portion of the processor cores that are not currently being used to execute background tasks to execute host I/O request processing.

In response to detecting a high load on the containerized service, the storage system application may yield at least one of the processor cores in the shared portion of the processor cores for preferred execution of the containerized service with respect to execution of the storage system application. Further in response to detecting a high load on the containerized service, the storage system application may more frequently yield at least one shared processor core for preferred execution of the containerized service than for low loads.

FIG. 1 is a block diagram showing an operational environment for the disclosed technology, including an example of a data storage system in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications executing thereon may access non-volatile data storage provided by Data Storage System 116, for example over one or more networks, such as a local area network (LAN), and/or a wide area network (WAN) such as the Internet, etc., and shown for purposes of illustration in FIG. 1 by Network 114. Alternatively, or in addition, one or more of Hosts 110(1) and/or applications accessing non-volatile data storage provided by Data Storage System 116 may execute within Data Storage System 116.

Data Storage System 116 includes at least one Storage Processor 120 that is communicably coupled to both Network 114 and Physical Non-Volatile Data Storage Drives 128, e.g. at least in part though one or more Communication Interfaces 122. No particular hardware configuration is required, and Storage Processor 120 may be embodied as any specific type of device that is capable of processing host input/output (I/O) requests (e.g. I/O read and I/O write requests, etc.), and of persistently storing host data.

The Physical Non-Volatile Data Storage Drives 128 may include physical data storage drives such as solid state drives, magnetic disk drives, hybrid drives, optical drives, and/or other specific types of drives.

A Memory 126 in Storage Processor 120 stores program code that is executed on Processing Circuitry 124, as well as data generated and/or processed by such program code. Memory 126 may include volatile memory (e.g. RAM), and/or other types of memory.

Memory 126 may include and/or be communicably coupled with a Cache 146. Cache 146 may be used to cache host data received by Storage Processor 120 from Hosts 110 (e.g. host data indicated in I/O write requests). Host data stored in Cache 146 is flushed from time to time from Cache 146 into Physical Non-Volatile Data Storage Drives 128.

Processing Circuitry 124 includes or consists of multiple Processor Cores 130, e.g. within one or more multi-core processor packages. Each processor core in Processor Cores 130 includes or consists of a separate processing unit, sometimes referred to as a Central Processing Unit (CPU). Each individual processor core in Processor Cores 130 is made up of separate electronic circuitry that is capable of independently executing instructions.

Processing Circuitry 124 and Memory 126 together form control circuitry that is configured and arranged to carry out various methods and functions described herein. The Memory 126 stores a variety of software components that may be provided in the form of executable program code. For example, Memory 126 may include software components such as Storage System 136 and Operating System 148. When program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also include various other specific types of software components.

In the example of FIG. 1, Storage System Application 136 is an application executing in Data Storage System 116, and provides a block-based (aka "block level") data storage service to one or more of the Hosts 110. The block-based data storage service provided by Storage System Application 136 processes block-based I/O requests received by Data Storage System 116 from Hosts 110. The block-based I/O requests processed by Storage System Application 136 enable the Hosts 110 to indicate blocks of host data that is written to and read from blocks of the non-volatile data storage that is served by Data Storage System 116. The block-based I/O requests processed by Storage System Application 136 are communicated to Data Storage System 116 by Hosts 110 using a block-based storage protocol that is supported by Storage System Application 136. In this way, Storage System Application 136 enables the Hosts 110 to connect to Data Storage System 116 using a block-based data storage protocol. Examples of block-based data storage protocols that may be supported by Storage System Application 136 in various embodiments include without limitation Fibre Channel (FC), Internet Small Computer Systems Interface (iSCSI), and/or Non-Volatile Memory Express (NVMe) protocols.

Host I/O Request Processing Logic 138 performs in-line processing of block-based host I/O requests that are received by Data Storage System 116. In the case of a received I/O write request, Host I/O Request Processing Logic 138 performs all processing that is necessary to perform before an acknowledgement is returned to the host indicating that the host data indicated by the I/O write request has been securely stored by Data Storage System 116. Such processing includes securely storing the host data indicated by the I/O write request either into the Cache 146 and/or into Physical Non-Volatile Data Storage Drives 128. In the case of a received I/O read request, Host I/O Request Processing Logic 138 performs the processing that is necessary to perform before the host data requested by the I/O read request is returned to the host. Such processing includes reading the requested data from Cache 146 or Physical Non-Volatile Data Storage Drives 128, and may further include performing any additional data processing that may be necessary, such as decompression, decryption, etc., of the host data.

Background Task Logic 140 performs background processing of host data that is not performed in-line by Host I/O Request Processing Logic 138, and that may accordingly be deferred. Such background processing of host data may include processing of host data indicated by an I/O write request that can be performed after an acknowledgement is returned to the host indicating that the host data indicated by the host I/O write request has been securely stored in the Data Storage System 116. One example of background processing of host data that is performed by Background Task Logic 140 is flushing of host data indicated by I/O write requests from Cache 146 to Physical Non-Volatile Data Storage Drives 126. Other examples of background processing of host data that may be performed by Background Task Logic 140 include compression, deduplication, and/or encryption of host data stored in either Cache 146 and/or Physical Non-Volatile Data Storage Drives 128.

Containerized Service 136 is a containerized service that is installed in Operating System 148, and that executes in Data Storage System 116. Containerized Service 136 may, for example, include file-based data storage service logic that provides a file-level data storage service, and that is packaged with its own software logic, libraries, and/or configuration files in a software container that is installed into Operating System 148. For example, in some embodiments, Containerized Service 136 may be provided as a Docker container hosted in a Docker Engine, as developed by Docker, Inc.

Containerized Service 150 provides a file-based (aka "file-level") data storage service to one or more of the Hosts 110. The file-based data storage service provided by Containerized Service 150 processes file-based I/O requests received by Data Storage System 116 from Hosts 110. The file-based I/O requests received by Data Storage System 116 from Hosts 110 and processed by Containerized Service 150 access files that are served by Containerized Service 150 to the Hosts 110, and that are stored in the Physical Non-Volatile Data Storage Drives 128. In this way, Containerized Service 150 provides file-level storage and acts as Network Attached Storage (NAS) for the Hosts 110. The file-based I/O requests processed by Containerized Service 150 are communicated to Data Storage System 116 by Hosts 110 using a file-based storage protocol that is supported by Containerized Service 150. Containerized Service 150 enables the Hosts 110 to connect to Data Storage System 116 using such a file-based storage protocol. Examples of file-based storage protocols that may be supported by Containerized Service 150 include without limitation Network File System (NFS) and/or Server Message Block (SMB) protocols.

Dynamic Core Assignment Logic 142 dynamically determines both i) which processor cores in Processor Cores 130 are used to execute Host I/O Request Processing Logic 138, and ii) which processor cores in Processor Cores 130 are used to execute Background Task Logic 140. For example, Dynamic Core Assignment Logic 142 may dynamically assign threads of execution of Host I/O Request Processing Logic 138 to specific processor cores, and dynamically assigning threads of execution of Background Task Logic 140 to other specific processor cores. Dynamic Core Assignment Logic 142 operates such that the same processor core is never used to simultaneously execute both Host I/O Request Processing Logic 138 and Background Task Logic 140.

At an initial point in time, e.g. system initialization, some number of processor cores in Processor Cores 130 are uniquely allocated to a shared portion of the Processor Cores 130, as shown by Shared Processor Cores 132. At the same time, some number of processor cores in Processor Cores 130 are uniquely allocated to a non-shared portion of the Processor Cores 130, as shown by Non-Shared Processor Cores 134. For example, Operating System 148 may allocate specific processor cores to Shared Processor Cores 132, and other specific processor cores to Non-Shared Processor Cores 134, e.g. based on system configuration settings or the like. Any individual processor core is only allocated to one of either Shared Processor Cores 132 or Non-Shared Processor Cores 134.

Processor Cores 130 may contain any specific number of processor cores, and Shared Processor Cores 132 and Non-Shared Processor Cores 134 may be allocated various specific numbers of processor cores. For example, in one embodiment, Processor Cores 130 may contain thirty four processor cores, with Shared Processor Cores 132 being allocated seventeen processor cores, and Non-Shared Processor Cores 134 being allocated seventeen processor cores. In another embodiment, Processor Cores 130 may contain eight processor cores, with Shared Processor Cores 132 being allocated four processor cores, and Non-Shared Processor Cores 134 being allocated four processor cores.

Each processor core allocated to Shared Processor Cores 132 is used (e.g. by Operating System 148) to execute both Storage System Application 136 and Containerized Service 150. In this way, each processor core in Shared Processor Cores 132 is shared between Storage System Application 136 and Containerized Service 150.

Each processor core allocated to Non-Shared Processor Cores 134 is only used (e.g. by Operating System 148) to execute Storage System Application 136. In this way, each processor core in Non-Shared Processor Cores 134 is allocated for exclusive use by Storage System Application 136.

Dynamic Core Assignment Logic 142 preferentially uses processor cores in Shared Processor Cores 132 to execute Background Task Logic 140. For example, Dynamic Core Assignment Logic 142 preferentially assigns threads of execution of Background Task Logic 140 to processor cores in Shared Processor Cores 132. Dynamic Core Assignment Logic 142 assigns threads of execution of Background Task Logic 140 only to processor cores in Shared Processor Cores 132, until all processor cores in Shared Processor Cores 132 are currently being used to execute execution threads of Background Task Logic 140. When all processor cores in Shared Processor Cores 132 are currently being used to execute Background Task Logic 140, and at least one more processor core needs to be used to execute Background Task Logic 140 (e.g. because at least one more execution thread of Background Task Logic 140 needs to be assigned to a processor core), Dynamic Core Assignment Logic 142 then uses one or more processor cores from Non-Shared Processor Cores 134 to execute Background Task Logic 140.

Dynamic Core Assignment Logic 142 preferentially uses processor cores in Non-Shared Processor Cores 134 to execute Host I/O Request Processing Logic 138. For example, Dynamic Core Assignment Logic 142 preferentially assigns threads of execution of Host I/O Request Processing Logic 138 to all processor cores in Non-Shared Processor Cores 134 that are not currently being used to execute Background Task Logic 140. Dynamic Core Assignment Logic 142 assigns threads of execution of Host I/O Request Processing Logic 138 to processor cores in Non-Shared Processor Cores 134 that are not currently being used to execute Background Task Logic 140 until all processor cores in Non-Shared Processor Cores 134 that are not currently being used to execute Background Task Logic 140 are used to execute Host I/O Request Processing Logic 138. In the case where no processor cores in Non-Shared Processor Cores 134 are currently being used to execute Background Task Logic 140, Dynamic Core Assignment Logic 142 may assign threads of execution of Host I/O Request Processing Logic 138 to all processor cores in Non-Shared Processor Cores 134. In the case where less than all of the processor cores in Shared Processor Cores 133 are currently being used to execute Background Task Logic 140, Dynamic Core Assignment Logic 142 may additionally assign threads of execution of Host I/O Request Processing Logic 138 to one or more processor cores in Shared Processor Cores 132.

Dynamic Core Assignment Logic 142 may determine a total number of processor cores that are currently needed to execute Background Task Logic 140 performed by the storage system application. In response to determining that the total number of processor cores currently needed to execute Background Task Logic 140 is not greater than the total number of processor cores within Shared Processor Cores 132, Dynamic Core Assignment Logic 142 uses only processor cores that are within Shared Processor Cores 134 to execute Background Task Logic 140.

In response to determining that the total number of processor cores currently needed to execute Background Task Logic 140 is greater than the total number of processor cores within Shared Processor Cores 132, Dynamic Core Assignment Logic 142 uses all processor cores within Shared Processor Cores 134 and additionally at least one processor core within Non-Shared Processor Cores 134 to execute Background Task Logic 140.

In response to determining that the total number of processor cores currently needed to execute Background Task Logic 140 is not greater than the total number of processor cores within Shared Processor Cores 132, Dynamic Core Assignment Logic 142 may use at least all processor cores within Non-Shared Processor Cores 134 to execute Host I/O Request Processing Logic 138.

In response to determining that the total number of processor cores currently needed to execute Background Task Logic 140 is less than the total number of processor cores within Shared Processor Cores 132, Dynamic Core Assignment Logic 142 may use all processor cores within Non-Shared Processor Cores 134 and additionally at least one of the processor cores within Shared Processor Cores 132 to execute Host I/O Request Processing Logic 138.

In response to a determination that at least one of the processor cores in Shared Processor Cores 132 is currently being used to execute Host I/O Request Processing Logic 138, Dynamic Core Assignment Logic 142 may assign a relatively smaller amount of host I/O request processing to the processor core(s) in Shared Processor Cores 132 that are currently executing Host I/O Request Processing Logic 138 than an amount of host I/O request processing that is assigned to the processor cores within Non-Shared Processor Cores 134. For example, Dynamic Core Assignment Logic 142 may assign an execution thread of Host I/O Request Processing Logic 138 the that requires relatively fewer processor cycles to the processor core(s) in Shared Processor Cores 132, relative to the higher processor cycle requirements of the execution threads of Host I/O Request Processing Logic 138 that are currently executing on processor cores of Non-Shared Processor Cores 134.

In response to a determination that multiple processor cores within Shared Processor Cores 132 are currently being used to execute Host I/O Request Processing Logic 138, Dynamic Core Assignment Logic 142 may select amounts of host I/O request processing to assign to individual ones of the processor cores within Shared Processor Cores 132 that are currently being used to execute host I/O request processing, based on loading feedback obtained for individual ones of the processor cores within Shared Processor Cores 132 that are currently being used to execute host I/O request processing. Dynamic Core Assignment Logic 142 may assign execution threads of Host I/O Request Processing Logic 138 that require relatively higher amounts of processor cycles to those processor cores in the Shared Processor Cores 132 that have relatively lower current load levels.

In response to a determination that the total number of processor cores currently needed to execute Background Task Logic 140 is greater than the total number of processor cores within Shared Processor Cores 132, Dynamic Core Assignment Logic 142 uses only those processor cores within Non-Shared Processor Cores 134 that are not currently being used to execute Background Task Logic 140 to execute Host I/O Request Processing Logic 138.

In some embodiments, Core Yielding Logic 144 may, in response to detecting a high load on the containerized service, yield at least one of the processor cores in Shared Processor Cores 132 for preferred execution of Containerized Service 150 with respect to execution of the Storage System Application 136. Operation of the Core Yielding Logic 144 is further described below with reference to FIG. 4.

Figure 2:
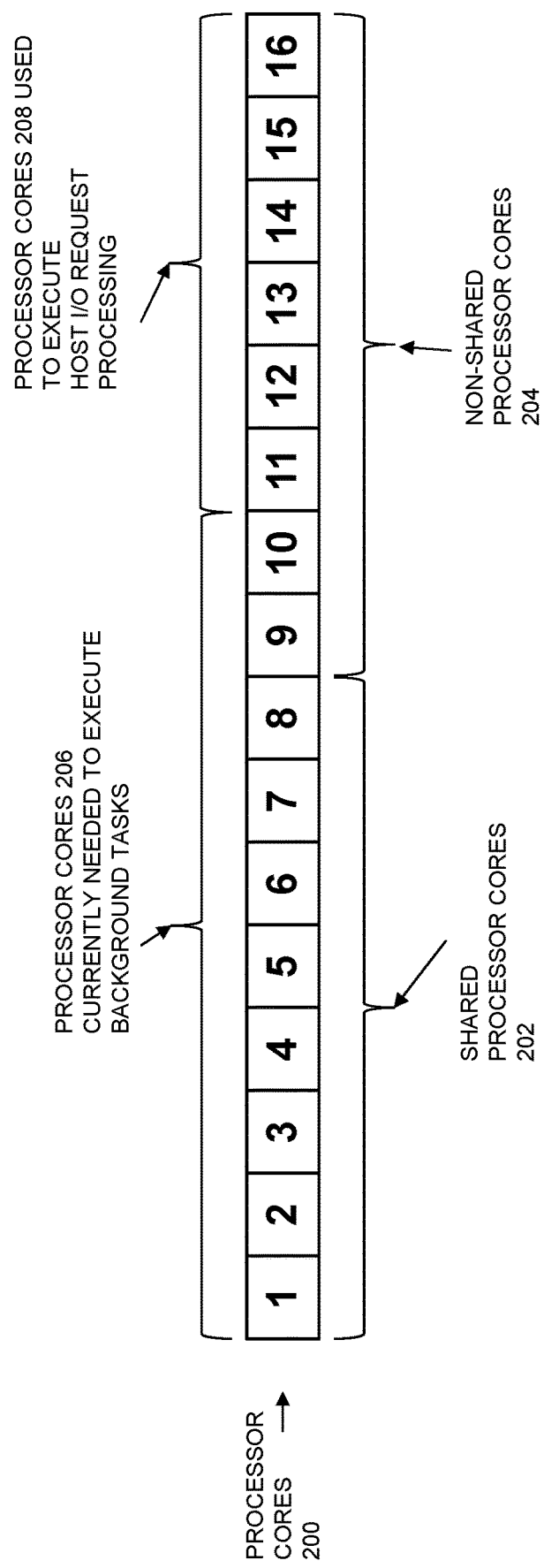
FIG. 2 is a block diagram showing an example of operation of an embodiment of disclosed technology, in which the processor cores currently needed to execute background tasks of the data storage application include all of the shared processor cores, and at least one of the non-shared processor cores.

FIG. 2 is a block diagram illustrating an example of the operation of an embodiment of disclosed technology. As shown in FIG. 2, Processor Cores 200 (e.g. processor cores 1 through 16) include eight processor cores (e.g. processor cores 1-8) that are allocated to Shared Processor Cores 202, and eight other processor cores (e.g. processor cores 9-16) that are allocated to Non-Shared Processor Cores 204. The disclosed technology determines that ten processor cores are currently needed to execute background tasks of the storage system application, e.g. by determining that ten execution threads currently need to be executed in order to perform ten corresponding background tasks. Accordingly, in response to the determination that ten processor cores are currently needed to execute background tasks, which is greater than the total number of processor cores in Shared Processor Cores 206, the disclosed technology determines that the Processor Cores 206 that are needed to execute background tasks include i) all of the processor cores in Shared Processor Cores 202 (processor cores 1-8), and additionally ii) two of the processor cores in Non-Shared Processor Cores 204 (processor cores 9-10). Further in response to a determination that the number of processor cores currently needed to execute background tasks is greater than the total number processor cores in Shared Processor Cores 202, the disclosed technology also determines that the Processor Cores 208 that are used to execute host I/O request processing include only those processor cores in Non-Shared Processor Cores 204 that are not currently needed to execute background tasks, e.g. processor cores 11-16.

Figure 3:
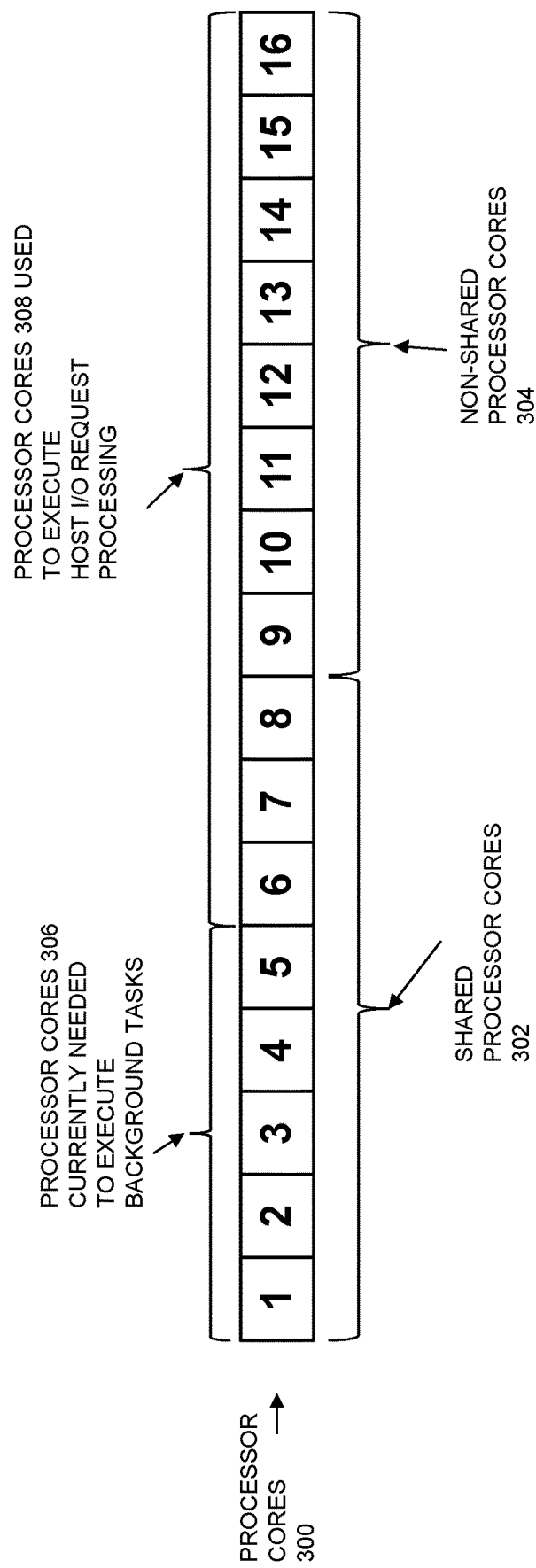
FIG. 3 is a block diagram showing an example of operation of an embodiment of the disclosed technology, in which the processor cores currently needed to execute background tasks of the data storage application include less than all of the shared processor cores.

FIG. 3 is a block diagram showing another example of operation of an embodiment of disclosed technology. In FIG. 3, Processor Cores 300 (e.g. processor cores 1 through 16) include eight processor cores (e.g. processor cores 1-8) that are allocated to Shared Processor Cores 302, and eight other processor cores (e.g. processor cores 9-16) that are allocated to Non-Shared Processor Cores 304. The disclosed technology determines that five processor cores are currently needed to execute background tasks of the storage system application, e.g. by determining that five execution threads currently need to be executed in order to perform five corresponding background tasks. Accordingly, in response to the determination that five processor cores are currently needed to execute background tasks, the disclosed technology uses only five processor cores in Shared Processor Cores 302 to execute background tasks, e.g. processor cores 1-5. In response to determining that the number of processor cores currently needed to execute background tasks is less than the total number of processor cores in Shared Processor Cores 302, the disclosed technology determines that the processor cores in Processor Cores 308 that are used to execute host I/O request processing include all the processor cores in Non-Shared Processor Cores 304 (processor cores 9-16), and additionally those processor cores in Shared Processor Cores 302 that are not currently needed to execute background tasks, e.g. processor cores 6-8.

Figure 4:
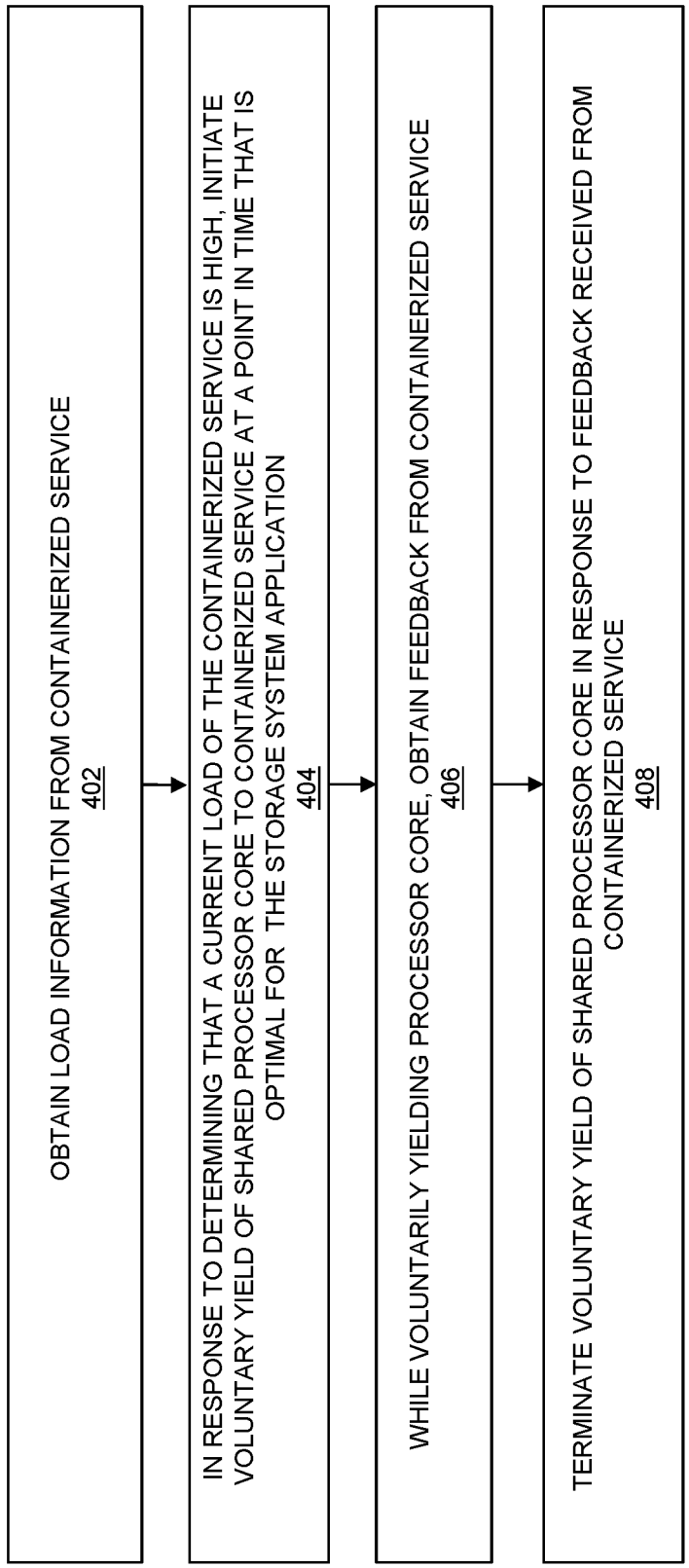
FIG. 4 is a flow chart showing an example of steps performed in some embodiments to provide controlled yield of at least one of the shared processor cores to the containerized service.

FIG. 4 is a flow chart showing an example of steps performed in some embodiments to provide periods during which the storage system application voluntarily yields the use of at least one of the shared processor cores to preferentially execute the containerized service. The steps of FIG. 4 may, for example, be performed at least in part by the Core Yielding Logic 144 shown in FIG. 1.

At step 402, the disclosed technology obtains current load level information for the containerized service, indicating how heavily loaded the containerized service currently is. The load information for the containerized service may, for example, include or consist of current latency with regard to processing of host I/O requests by the containerized service, amount of processor core utilization by the containerized service with regard to one or more of the shared processor cores, or some other indication of the current load of the containerized service.

At step 404, in response to determining that a current load of the containerized service is higher than a predetermined threshold, the disclosed technology initiates voluntary yielding of at least one of the shared processor cores to execution of the containerized service. The voluntary yielding of shared processor cores to the containerized service causes the containerized service to be preferentially executed relative to execution of the storage service application on those shared processor cores for a period of time. For example, an indication may be provided to the operating system that execution of the containerized service is to be preferred relative to execution of the storage system on some number of the shared processor cores. As a result, during each time period in which the storage system application voluntarily yields shared processor cores, the operating system gives the containerized service more opportunities to execute on those shared processor cores (e.g. gives relatively more CPU cycles of those shared processor cores to the containerized service) than are given to the storage system application.

The initiation of a period of voluntary yielding of one or more shared processor core(s) to the containerized service at step 404 is performed at a point in time during execution of the storage system application that is optimal for the storage system application. For example, such an optimal point in time may occur when the storage system application is not holding any locks, and not during the execution of any critical section of the storage system application logic.

At step 406, while voluntarily yielding one or more shared processor cores to the containerized service, the disclosed technology obtains feedback (e.g. from the containerized service), in order to determine when to terminate the period of voluntary yielding. For example, the feedback obtained may indicate processor core utilization levels with regard to execution of the containerized service, latency with regard to host I/O request processing performed by the containerized service, etc.

At step 408, the disclosed technology terminates the period of voluntarily yielding one or more shared processor cores to the containerized service in response to determining that the feedback obtained at step 406 indicates that a current load on the containerized service is currently at or below a threshold level.

The disclosed technology may also operate by changing a frequency of the time periods during which it voluntarily yields one or more shared processor cores to the containerized service, based on load feedback obtained regarding the containerized service. For example, the disclosed technology may provide time periods during which it voluntarily yields one or more shared processor cores to the preferred execution of the containerized service at a relatively high frequency in response to detecting a high load on the containerized service, e.g. in response to detecting that a current load on the containerized service exceeds a threshold load level.

Figure 5:
FIG. 5 is a flow chart showing an example of steps performed in some embodiments to select specific amounts of host I/O request processing to be executed by specific individual shared processor cores based on current load information obtained with regard to shared processor cores that are currently being used to execute host I/O request processing.

FIG. 5 is a flow chart showing an example of steps performed in some embodiments to select specific amounts of host I/O request processing to be executed by specific individual shared processor cores, based on current load information obtained with regard to multiple shared processor cores that are currently being used to execute host I/O request processing (e.g. shared processor cores that are currently being used to execute Host I/O Request Processing Logic 138). The steps of FIG. 5 may, for example, be performed by the Dynamic Core Assignment Logic 142 shown in FIG. 1.

At step 502, the disclosed technology obtains total load information regarding individual ones of multiple shared processor cores that are currently being used to execute host I/O request processing. The load information may, for example, indicate a total current level of utilization (including utilization to execute host I/O request processing and to execute the containerized service) for each individual one of the shared processor cores.

At step 504, based on the load information obtained at step 502, the disclosed technology selects amounts of host I/O request processing to be assigned to individual ones of the shared processor cores that are currently being used to execute host I/O request processing. For example, relatively larger amounts of host I/O request processing may be assigned to individual ones of the shared processor cores that currently have a relatively lower current cumulative load than the amounts of host I/O request processing that is assigned to individual shared processor cores that currently have a relatively lower current cumulative load.

Figure 6:
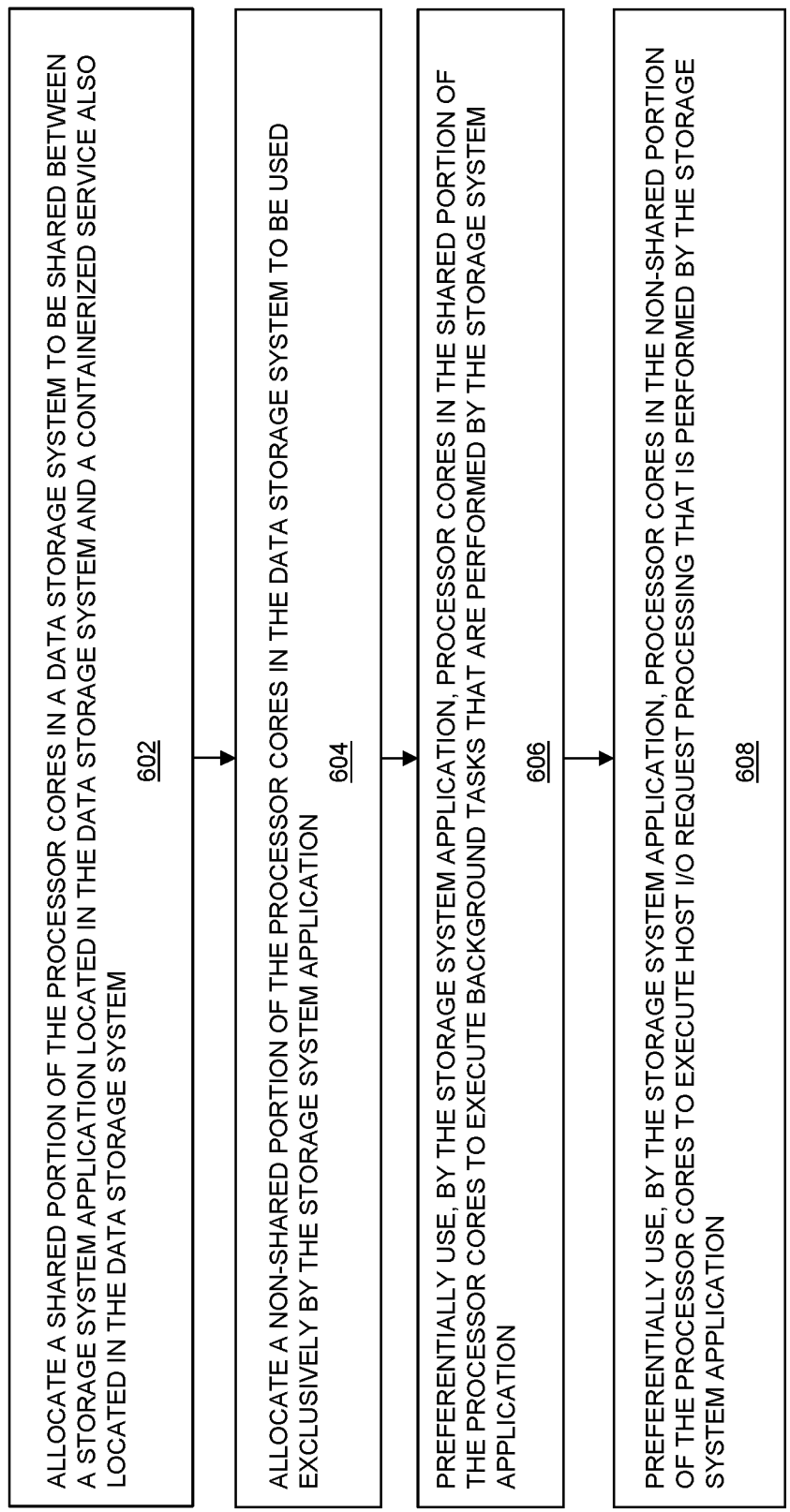
FIG. 6 is a flow chart showing an example of steps performed in some embodiments.

FIG. 6 is a flow chart showing an example of steps that may be performed in some embodiments of the disclosed technology.

At step 602, the disclosed technology allocates a shared portion of the processor cores in a data storage system. The processor cores in the shared portion of the processor cores are shared between a storage system application located in the data storage system and a containerized service that is also located in the data storage system.

At step 604, the disclosed technology allocates a non-shared portion of the processor cores in the data storage system. The processor cores in the non-shared portion of the processor cores are used exclusively by the storage system application.

At step 606, the disclosed technology causes the storage system application to preferentially use processor cores in the shared portion of the processor cores to execute background tasks that are performed by the storage system application.

At step 608, the disclosed technology causes the storage system application to preferentially use processor cores in the non-shared portion of the processor cores to execute host I/O request processing that is performed by the storage system application.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
  allocating a shared portion of a plurality of processor cores in a data storage system, wherein processor cores in the shared portion of the processor cores are shared between a storage system application located in the data storage system and a containerized service also located in the data storage system;
  allocating a non-shared portion of the processor cores, wherein processor cores in the non-shared portion of the processor cores are used exclusively by the storage system application;
  using, by the storage system application, processor cores in the shared portion of the processor cores to execute background tasks performed by the storage system application, wherein using processor cores in the shared portion of the processor cores to execute the background tasks performed by the storage system application includes:
    determining a total number of processor cores currently needed to execute the background tasks performed by the storage system application, and
    in response to determining that the total number of processor cores currently needed to execute the background tasks performed by the storage system application is not greater than a total number of processor cores within the shared portion of the processor cores, using only processor cores that are within the shared portion of the processor cores to execute the background tasks performed by the storage system application;
  using, by the storage system application, while only processor cores that are within the shared portion of the processor cores are simultaneously being used to execute the background tasks performed by the storage system application, processor cores in the non-shared portion of the processor cores to execute host Input/Output (I/O) request processing performed by the storage system application;

wherein the containerized service provides a file-based data storage service to one or more hosts;
wherein the storage system application provides a block-based data storage service to one or more hosts;
in response to determining that the total number of processor cores currently needed to execute the background tasks performed by the storage system application is currently less than the total number of processor cores within the shared portion of the processor cores, using all processor cores that are within the non-shared portion of the processor cores and at least one processor core within the shared portion of the processor cores that is not currently being used to execute the background tasks performed by the storage system application to execute host I/O request processing performed by the storage system application;
assigning an amount of host I/O request processing to the at least one processor core within the shared portion of the processor cores that is smaller than an amount of host I/O request processing that is assigned to the processor cores within the non-shared portion of the processor cores;
periodically yielding, by the storage system application, at least one of the processor cores in the shared portion of the processor cores for preferred execution of the containerized service with respect to execution of the storage system application, wherein a frequency at which the storage system application yields the at least one processor core in the shared portion of the processor cores for preferred execution of the containerized service with respect to execution of the storage system application is increased in response to detecting a high load on the containerized service; and
whereby using processor cores within the shared portion of the processor cores to execute the background tasks performed by the storage system application and processor cores within the non-shared portion of the processor cores to execute host I/O request processing performed by the storage system application advantageously improves processor core utilization while also avoiding undesirable increases in host I/O request processing latency that would result from execution of host I/O request processing being interrupted by execution of the containerized service on the processor cores within the shared portion of the processor cores.

2. The method of claim 1, wherein using processor cores in the shared portion of the processor cores to execute the background tasks performed by the storage system application further includes:
in response to determining that the total number of processor cores that are currently needed to execute the background tasks performed by the storage system application is greater than the total number of processor cores within the shared portion of the processor cores, using all the processor cores within the shared portion of the processor cores and at least one of the processor cores within the non-shared portion of the processor cores to execute the background tasks performed by the storage system application.

3. The method of claim 2, further comprising:
further in response to determining that the total number of processor cores that are currently needed to execute the background tasks performed by the storage system application is greater than the total number of processor cores within the shared portion of the processor cores, using all processor cores within the non-shared portion of the processor cores not currently being used to execute the background tasks performed by the storage system application to execute the host I/O request processing performed by the storage system application.

4. The method of claim 1, further comprising:
selecting the amount of host I/O request processing assigned to the at least one processor core within the shared portion of the processor cores being used to execute host I/O request processing performed by the storage system application based on loading feedback obtained for the at least one processor core within the shared portion of the processor cores being used to execute host I/O request processing performed by the storage system application.

5. A data storage system comprising:
processing circuitry and a memory;
a plurality of non-volatile data storage drives; and
wherein the memory has program code stored thereon, wherein the program code, when executed by the processing circuitry, causes the processing circuitry to:
allocate a shared portion of a plurality of processor cores in a data storage system, wherein processor cores in the shared portion of the processor cores are shared between a storage system application located in the data storage system and a containerized service also located in the data storage system;
allocate a non-shared portion of the processor cores, wherein processor cores in the non-shared portion of the processor cores are used exclusively by the storage system application;
use, by the storage system application, processor cores in the shared portion of the processor cores to execute background tasks performed by the storage system application, wherein the storage system application uses processor cores in the shared portion of the processor cores to execute the background tasks performed by the storage system application by:
determining a total number of processor cores currently needed to execute the background tasks performed by the storage system application, and
in response to determining that the total number of processor cores currently needed to execute the background tasks performed by the storage system application is not greater than a total number of processor cores within the shared portion of the processor cores, using only processor cores that are within the shared portion of the processor cores to execute the background tasks performed by the storage system application;
use, by the storage system application, while only processor cores that are within the shared portion of the processor cores are simultaneously being used to execute the background tasks performed by the storage system application, processor cores in the non-shared portion of the processor cores to execute host input/output (I/O) request processing performed by the storage system application;
wherein the containerized service provides a file-based data storage service to one or more hosts;
wherein the storage system application provides a block-based data storage service to one or more hosts;
in response to determining that the total number of processor cores currently needed to execute the background tasks performed by the storage system application is currently less than the total number of processor cores within the shared portion of the processor cores, using all processor cores that are within the non-shared portion of the processor cores and at least one processor core within the shared portion of the processor cores that is not currently being used to execute the background tasks performed by the storage system application to execute host I/O request processing performed by the storage system application;

assigning an amount of host I/O request processing to the at least one processor core within the shared portion of the processor cores that is smaller than an amount of host I/O request processing that is assigned to the processor cores within the non-shared portion of the processor cores;

periodically yielding, by the storage system application, at least one of the processor cores in the shared portion of the processor cores for preferred execution of the containerized service with respect to execution of the storage system application, wherein a frequency at which the storage system application yields the at least one processor core in the shared portion of the processor cores for preferred execution of the containerized service with respect to execution of the storage system application is increased in response to detecting a high load on the containerized service; and whereby using processor cores within the shared portion of the processor cores to execute the background tasks performed by the storage system application and processor cores within the non-shared portion of the processor cores to execute host I/O request processing performed by the storage system application advantageously improves processor core utilization while also avoiding undesirable increases in host I/O request processing latency that would result from execution of host I/O request processing being interrupted by execution of the containerized service on the processor cores within the shared portion of the processor cores.

6. The data storage system of claim 5, wherein the program code, when executed by the processing circuitry, further causes the storage system application to use processor cores in the shared portion of the processor cores to execute the background tasks performed by the storage system application at least in part by:

in response to determining that the total number of processor cores that are currently needed to execute the background tasks performed by the storage system application is greater than the total number of processor cores within the shared portion of the processor cores, using all the processor cores within the shared portion of the processor cores and at least one of the processor cores within the non-shared portion of the processor cores to execute the background tasks performed by the storage system application.

7. The data storage system of claim 6, wherein the program code, when executed by the processing circuitry, further causes the storage system application to:

further in response to determining that the total number of processor cores that are currently needed to execute the background tasks performed by the storage system application is greater than the total number of processor cores within the shared portion of the processor cores, using all processor cores within the non-shared portion of the processor cores not currently being used to execute the background tasks performed by the storage system application to execute the host I/O request processing performed by the storage system application.

8. The data storage system of claim 5, wherein the program code, when executed by the processing circuitry, further causes the storage system application to:

select the amount of host I/O request processing assigned to the at least one processor core within the shared portion of the processor cores being used to execute host I/O request processing performed by the storage system application based on loading feedback obtained for the at least one processor core within the plurality of processor cores within the shared portion of the processor cores being used to execute host I/O request processing performed by the storage system application.

9. A computer program product including a non-transitory computer readable medium having instructions stored thereon, wherein the instructions, when executed on processing circuitry, cause the processing circuitry to perform steps including:

allocating a shared portion of a plurality of processor cores in a data storage system, wherein processor cores in the shared portion of the processor cores are shared between a storage system application located in the data storage system and a containerized service also located in the data storage system;

allocating a non-shared portion of the processor cores, wherein processor cores in the non-shared portion of the processor cores are used exclusively by the storage system application;

using, by the storage system application, processor cores in the shared portion of the processor cores to execute background tasks performed by the storage system application, wherein using processor cores in the shared portion of the processor cores to execute the background tasks performed by the storage system application includes:

determining a total number of processor cores currently needed to execute the background tasks performed by the storage system application, and in response to determining that the total number of processor cores currently needed to execute the background tasks performed by the storage system application is not greater than a total number of processor cores within the shared portion of the processor cores, using only processor cores that are within the shared portion of the processor cores to execute the background tasks performed by the storage system application;

using, by the storage system application, while only processor cores that are within the shared portion of the processor cores are simultaneously being used to execute the background tasks performed by the storage system application, processor cores in the non-shared portion of the processor cores to execute host Input/Output (I/O) request processing performed by the storage system application;

wherein the containerized service provides a file-based data storage service to one or more hosts;

wherein the storage system application provides a block-based data storage service to one or more hosts;

in response to determining that the total number of processor cores currently needed to execute the background tasks performed by the storage system application is currently less than the total number of processor cores within the shared portion of the processor cores, using all processor cores that are within the non-shared portion of the processor cores and at least one processor core within the shared portion of the processor cores that is not currently being used to execute the background tasks performed by the storage system application to execute host I/O request processing performed by the storage system application;

assigning an amount of host I/O request processing to the at least one processor core within the shared portion of the processor cores that is smaller than an amount of host I/O request processing that is assigned to the processor cores within the non-shared portion of the processor cores;

periodically yielding, by the storage system application, at least one of the processor cores in the shared portion of the processor cores for preferred execution of the containerized service with respect to execution of the storage system application, wherein a frequency at which the storage system application yields the at least one processor core in the shared portion of the processor cores for preferred execution of the containerized service with respect to execution of the storage system application is increased in response to detecting a high load on the containerized service; and whereby using processor cores within the shared portion of the processor cores to execute the background tasks performed by the storage system application and processor cores within the non-shared portion of the processor cores to execute host I/O request processing performed by the storage system application advantageously improves processor core utilization while also avoiding undesirable increases in host I/O request processing latency that would result from execution of host I/O request processing being interrupted by execution of the containerized service on the processor cores within the shared portion of the processor cores.

* * * * *